United States Patent
Hara et al.

(10) Patent No.: US 9,766,095 B2
(45) Date of Patent: Sep. 19, 2017

(54) MAGNETIC POSITION DETECTION DEVICE AND MAGNETIC POSITION DETECTION METHOD

(71) Applicant: Mitsubishi Electric Corporation, Tokyo (JP)

(72) Inventors: Takafumi Hara, Tokyo (JP); Yuji Kawano, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 152 days.

(21) Appl. No.: 14/774,386

(22) PCT Filed: Apr. 23, 2013

(86) PCT No.: PCT/JP2013/061871
§ 371 (c)(1),
(2) Date: Sep. 10, 2015

(87) PCT Pub. No.: WO2014/174586
PCT Pub. Date: Oct. 30, 2014

(65) Prior Publication Data
US 2016/0041010 A1    Feb. 11, 2016

(51) Int. Cl.
*G01B 7/14* (2006.01)
*G01D 5/244* (2006.01)
(Continued)

(52) U.S. Cl.
CPC ............... *G01D 5/244* (2013.01); *G01D 5/14* (2013.01); *G01D 5/145* (2013.01); *G01D 5/2451* (2013.01)

(58) Field of Classification Search
CPC .................................................. G01D 5/145
(Continued)

(56) References Cited

U.S. PATENT DOCUMENTS

| 4,866,381 A | 9/1989 | Tatsuhiko |
| 6,018,881 A * | 2/2000 | Spies ............ G01D 5/145 |
| | | 324/207.24 |

(Continued)

FOREIGN PATENT DOCUMENTS

| JP | 58-035414 A | 3/1983 |
| JP | 62-237314 A | 10/1987 |

(Continued)

OTHER PUBLICATIONS

Communication dated Aug. 23, 2016 from the State Intellectual Property Office of the P.R.C. in counterpart application No. 201380075894.4.

*Primary Examiner* — Reena Aurora
(74) *Attorney, Agent, or Firm* — Sughrue Mion, PLLC; Richard C. Turner

(57) ABSTRACT

A magnetized scale (1a) in which magnetic pole pairs each formed of a first magnetic portion (11a) and a second magnetic portion (12a) having different magnetic properties are arranged with a period of a magnetic pole pair width 2λ, and a magnetosensitive device (2) in which n magnetosensitive elements (21a to 21e) are arranged with a magnetosensitive element pitch P so that λ=nP may be established are arranged so as to be opposed to each other with a predetermined air gap therebetween. Output values output from the n magnetosensitive elements (21a to 21e) in parallel are analyzed to calculate a relative position between the magnetosensitive device (2) and the magnetized scale (1a) as a position detection resolution of λ/n.

12 Claims, 14 Drawing Sheets

(51) Int. Cl.
*G01D 5/14* (2006.01)
*G01D 5/245* (2006.01)

(58) Field of Classification Search
USPC .................................................. 324/207.13
See application file for complete search history.

(56) References Cited

U.S. PATENT DOCUMENTS

| 7,705,587 B2 * | 4/2010 | Legrand ............. G01D 5/24438 |
| | | 324/207.2 |
| 2006/0202681 A1 | 9/2006 | Shoji |

FOREIGN PATENT DOCUMENTS

| JP | 64-044816 A | 2/1989 |
| JP | 05-84444 A | 12/1993 |
| JP | 2006-250604 A | 9/2006 |

* cited by examiner

MAGNETIC POSITION DETECTION DEVICE AND MAGNETIC POSITION DETECTION METHOD

CROSS REFERENCE TO RELATED APPLICATIONS

This is a National Stage of International Application No. PCT/JP2013/061871 filed Apr. 23, 2013, the contents of which are incorporated herein by reference in its entirety.

TECHNICAL FIELD

The present invention relates to a magnetic position detection device and a magnetic position detection method, which use a magnetized scale and a magnetosensitive element, and more particularly, to a magnetic position detection device and a magnetic position detection method, which are capable of improving a detection resolution with a simple configuration.

BACKGROUND ART

A commonly used magnetic position detection device of the related art has a structure in which a magnetosensitive element formed of a Hall element or a magnetoresistive element is arranged so as to be opposed to a magnetized scale formed of N poles and S poles that are alternately arranged with fixed lengths $\lambda$.

Then, a change of a magnetic field at the time when the magnetosensitive element moves relative to the magnetized scale is read to detect a relative position between the magnetosensitive element and the magnetized scale.

In such a magnetic position detection device of the related art, substantially sinusoidal output signals with a period of the monopole length $\lambda$, which are output when the magnetosensitive element moves relative to the magnetized scale, are converted into pulse signals and counted, to thereby detect the relative position between the magnetosensitive element and the magnetized scale at a position detection resolution of the monopole length $\lambda$ (see, for example, Patent Literature 1).

In Patent Literature 1, the position detection resolution comparable with the monopole length $\lambda$ of the magnetized scale can be obtained. However, an existing magnetizing device has a limitation on magnetization of N poles and S poles to the magnetized scale, and a practical limit value of the monopole length $\lambda$ of the magnetized scale is approximately 100 µm.

In an actual case, however, if the monopole length $\lambda$ is excessively reduced, the magnetic field formed by the magnetized scale is weakened, and hence even when the monopole length $\lambda$ is larger than the above-mentioned limit value, the magnetosensitive element cannot detect the monopole length $\lambda$. As a result, there is a problem in that the position detection resolution cannot be improved to be higher than a magnetic pole limit length $\lambda 0$ determined by the magnetic pole material and the magnetosensitive element to be used.

One method for solving the problem described above is to arrange eight magnetosensitive elements and process each output of the magnetosensitive elements by a logic circuit, to thereby obtain a pulse signal with three periods when the magnetosensitive element moves by the monopole length $\lambda$ (see, for example, Patent Literature 2).

Further, as another magnetic position detection device of the related art, a magnetic gear (magnetic scale) is used instead of a magnetized scale, and a change of a magnetic field formed by the magnetic gear and a magnet is measured by a magnetosensitive element, to thereby detect a relative rotation of the magnetic gear (see, for example, Patent Literature 3).

CITATION LIST

Patent Literature

[PTL 1] JP 1873523 B2
[PTL 2] JP 01-44816 A
[PTL 3] JP 58-35414 A

SUMMARY OF INVENTION

Technical Problems

The related art, however, has the following problems.

A rotary encoder disclosed in Patent Literature 1 needs to have an increased diameter of a cylindrical magnetized scale in order to improve an angle detection resolution, resulting in a problem in that the device is upsized to increase the cost.

Further, when the technology disclosed in Patent Literature 1 is applied to a linear encoder for detecting linear movement, there is a problem in that the position detection resolution cannot be improved to be higher than the magnetic pole limit length $\lambda 0$ determined by the magnetic pole material and the magnetosensitive element to be used.

In a magnetic position detection device disclosed in Patent Literature 2, there is needed a large number of the magnetosensitive elements, but is not proposed a method of further improving the position detection resolution.

In the magnetic position detection device disclosed in Patent Literature 3, there is proposed a method of obtaining a detection resolution (pulse) that is approximately twice as high as the number of teeth of the magnetic gear, but is not proposed a method of further improving the detection resolution. Further, there is a problem in that the magnetic gear needs to be upsized in order to improve the detection resolution.

The present invention has been made in order to solve the problems described above, and it is an object thereof to provide a magnetic position detection device and a magnetic position detection method, which are capable of improving a detection resolution with a simple configuration.

Solution to Problems

According to one embodiment of the present invention, there is provided a magnetic position detection device, including: a magnetized scale in which magnetic pole pairs each having a width $2\lambda$ and each being formed of a first magnetic portion having a width $\lambda$ and a second magnetic portion having the width $\lambda$, which have different magnetic properties, are arranged at equal pitches of a period of the magnetic pole pair width $2\lambda$; a magnetosensitive device arranged so as to be opposed to the magnetized scale with a predetermined air gap therebetween, the magnetosensitive device being configured to move relatively in a direction of arrangement of the magnetized scale within a magnetic field formed by the magnetized scale while maintaining the air gap, and to measure a change of the magnetic field due to the relative movement with use of magnetosensitive elements; and a position calculation circuit configured to analyze an output value of the magnetosensitive device, to thereby calculate a relative position between the magnetosensitive device and the magnetized scale, in which: the magnetosensitive device includes, as the magnetosensitive elements, a first magnetosensitive element group in which n first magnetosensitive elements, where n is a natural number of 2 or more, are arranged at equal magnetosensitive element pitches P so that $\lambda=nP$ is established, and the n first magnetosensitive elements of the first magnetosensitive element group are configured to output results of measuring the change of the magnetic field due to the relative movement in parallel; and the position calculation circuit analyzes output values that are output from the magnetosensitive device in parallel, to thereby calculate the relative position between the magnetosensitive device and the magnetized scale as a position detection resolution of $\lambda/n$.

Further, according to one embodiment of the present invention, there is provided a magnetic position detection method to be used for a magnetic position detection device, the magnetic position detection device including: a magnetized scale in which magnetic pole pairs each having a width $2\lambda$ and each being formed of a first magnetic portion having a width $\lambda$ and a second magnetic portion having the width $\lambda$, which have different magnetic properties, are arranged at equal pitches of a period of the magnetic pole pair width $2\lambda$; a magnetosensitive device arranged so as to be opposed to the magnetized scale with a predetermined air gap therebetween, the magnetosensitive device being configured to move relatively in a direction of arrangement of the magnetized scale within a magnetic field formed by the magnetized scale while maintaining the air gap, and to measure a change of the magnetic field due to the relative movement with use of magnetosensitive elements; and a position calculation circuit configured to analyze an output value of the magnetosensitive device, to thereby calculate a relative position between the magnetosensitive device and the magnetized scale, the magnetosensitive device including, as the magnetosensitive elements, a first magnetosensitive element group in which n first magnetosensitive elements, where n is a natural number of 2 or more, are arranged at equal magnetosensitive element pitches P so that $\lambda=nP$ is established, the n first magnetosensitive elements of the first magnetosensitive element group being configured to output results of measuring the change of the magnetic field due to the relative movement in parallel, the magnetic position detection method including: a Hi/Lo determination step of making, by the position calculation circuit, a Hi/Lo determination on each of the n output values output from the magnetosensitive device in parallel to obtain binary values, and outputting the obtained binary values as n Hi/Lo outputs; a storing step of storing, by the position calculation circuit, a position calculation table in a storage unit, in which a relationship between 2n internal magnetic pole positions M, where M represents 2n integers of 0 or more and 2n−1 or less, which are the relative positions within the magnetic pole pair width $2\lambda$, and a pattern of the n Hi/Lo outputs is defined in advance; and an internal magnetic pole position calculation step of calculating, by the position calculation circuit, based on the position calculation table stored in the storage unit in the storing step, the internal magnetic pole position M of the magnetosensitive device corresponding to the n Hi/Lo outputs as a position detection resolution of $\lambda/n$.

Advantageous Effects of Invention

According to the one embodiment of the present invention, the magnetized scale in which the magnetic pole pairs each formed of the first magnetic portion and the second magnetic portion having different magnetic properties are arranged with the period of the magnetic pole pair width $2\lambda$ and the magnetosensitive device in which the n magnetosensitive elements are arranged with the magnetosensitive element pitch P so that $\lambda=nP$ is established are arranged so as to be opposed to each other with a predetermined air gap therebetween, and the change of the magnetic field measured by the magnetosensitive device is analyzed. Consequently, the magnetic position detection device and the magnetic position detection method, which are capable of improving the detection resolution with a simple configuration, may be obtained.

DESCRIPTION OF EMBODIMENTS

Figure 1:
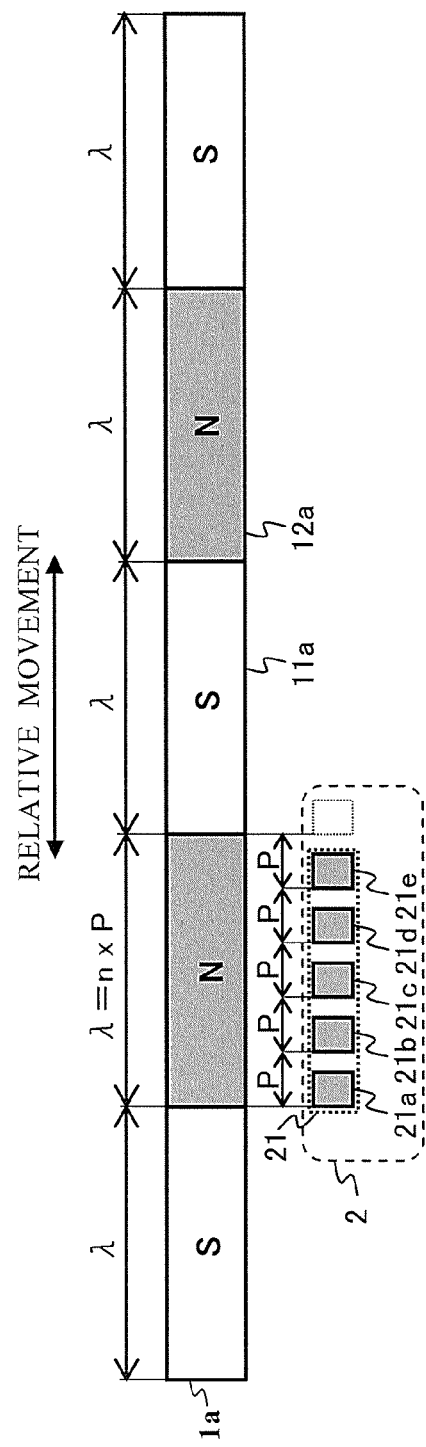
FIG. 1 is an exemplary diagram of a configuration of a magnetic position detection device according to a first embodiment of the present invention.

A description is now given of a magnetic position detection device and a magnetic position detection method according to exemplary embodiments of the present invention referring to the drawings. Note that, throughout the

First Embodiment

FIG. 1 is an exemplary diagram of a configuration of a magnetic position detection device according to a first embodiment of the present invention. The magnetic position detection device according to the first embodiment includes a magnetized scale 1a, a magnetosensitive device 2, and a position calculation circuit 3 (see FIG. 2).

As illustrated in FIG. 1, the magnetized scale 1a is formed in a manner that magnetic pole pairs each having a width 2λ and each being formed of an N pole 12a having a width λ and an S pole 11a having the width λ are arranged with equal pitches of a period of the magnetic pole pair width 2λ.

Because the magnetic pole pair has the magnetic properties of the N pole 12a and the S pole 11a, the magnetized scale 1a forms a magnetic field on the magnetosensitive device 2 side so that the magnetic field changes in intensity and direction with the period of the magnetic pole pair width 2λ.

Further, the magnetosensitive device 2 includes a first magnetosensitive element group 21 in which n first magnetosensitive elements 21a to 21e are arranged with equal magnetosensitive element pitches P so that λ=nP is established. A Hall element, a magnetoresistive element, or the like is used as the first magnetosensitive elements 21a to 21e.

Note that, in the drawings referred to in the following description, an example in which the first magnetosensitive element group 21 includes five first magnetosensitive elements 21a to 21e is illustrated, but the number n of the magnetosensitive elements arranged is not limited to five. The number n only needs to be a natural number of 2 or more.

The magnetosensitive device 2 is arranged so as to be opposed to the magnetized scale 1a so as to have a predetermined air gap therebetween. The magnetosensitive device 2 moves relatively in the direction of the arrangement of the magnetized scale 1a within the magnetic field formed by the magnetized scale 1a while maintaining the air gap. Then, a change of the magnetic field due to the relative movement is measured with use of the n first magnetosensitive elements 21a to 21e.

Note that, the respective air gaps between the first magnetosensitive elements 21a to 21e and the magnetized scale 1a are not necessarily required to be the same, and may differ among the first magnetosensitive elements 21a to 21e. It is only necessary that the air gap be maintained when each of the first magnetosensitive elements 21a to 21e moves relative to the magnetized scale 1a.

Further, the relative movement between the magnetosensitive device 2 and the magnetized scale 1a is assumed to be linear movement, but may be rotational movement. In the case of rotational movement, the magnetized scale 1a is arranged in a circle, and a relative angle between the magnetosensitive device 2 and the magnetized scale 1a is calculated instead of a relative position therebetween.

The position calculation circuit 3 analyzes an output value of the magnetosensitive device 2, to thereby calculate the relative position between the magnetosensitive device 2 and the magnetized scale 1a. Now, a detailed description is given of a circuit configuration of the position calculation circuit 3 and a method of calculating the relative position between the magnetosensitive device 2 and the magnetized scale 1a.

Figure 2:
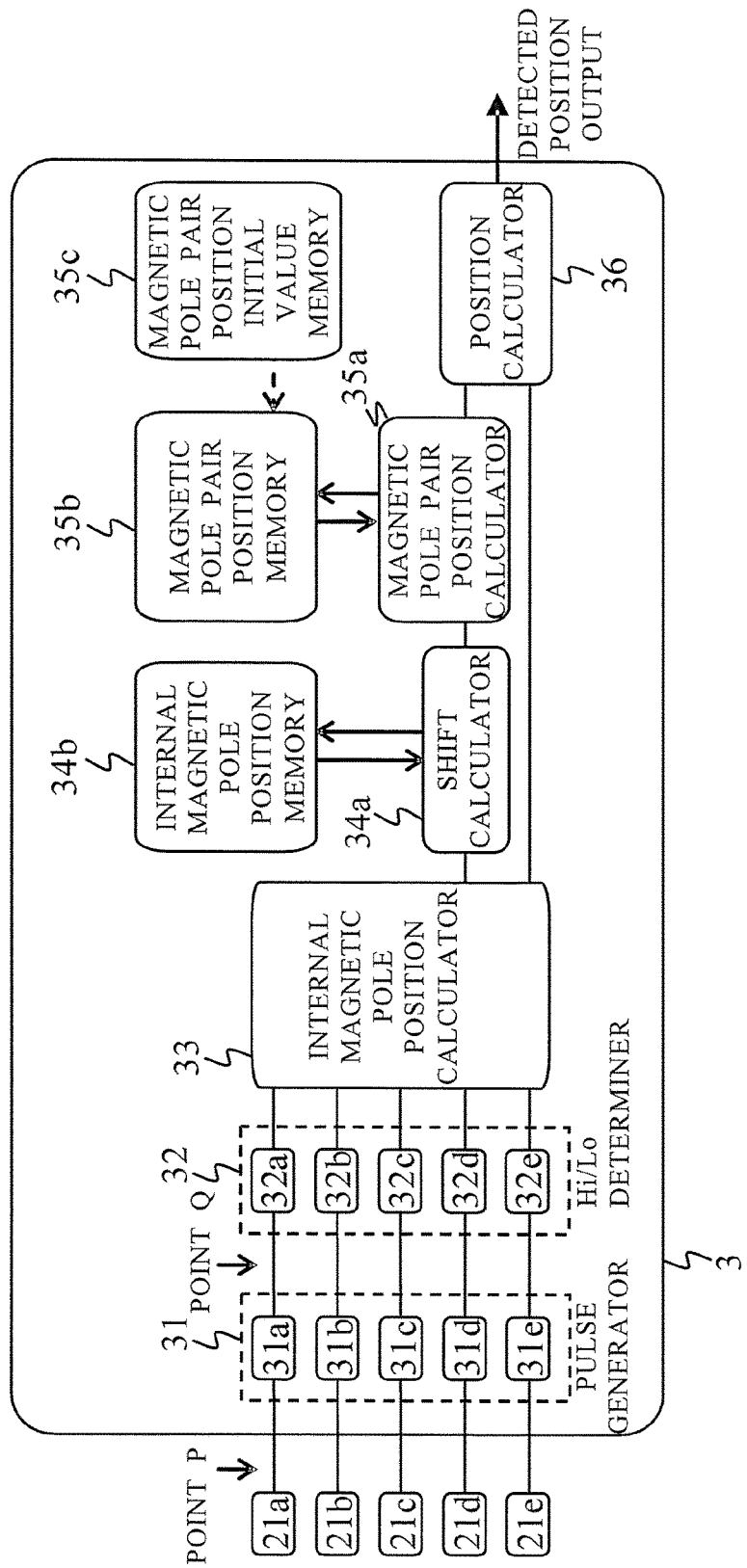
FIG. 2 is an exemplary diagram of a circuit configuration of an output of a magnetosensitive device according to the first embodiment of the present invention.

FIG. 2 is an exemplary diagram of the circuit configuration of the position calculation circuit 3 according to the first embodiment of the present invention. The position calculation circuit 3 according to the first embodiment includes a pulse generator 31, a Hi/Lo determiner 32, an internal magnetic pole position calculator 33, a shift operation section (sift calculator) 34a, an internal magnetic pole position memory 34b, a magnetic pole pair position calculator 35a, a magnetic pole pair position memory 35b, a magnetic pole pair position initial value memory 35c, and a position calculator 36.

Figure 3:
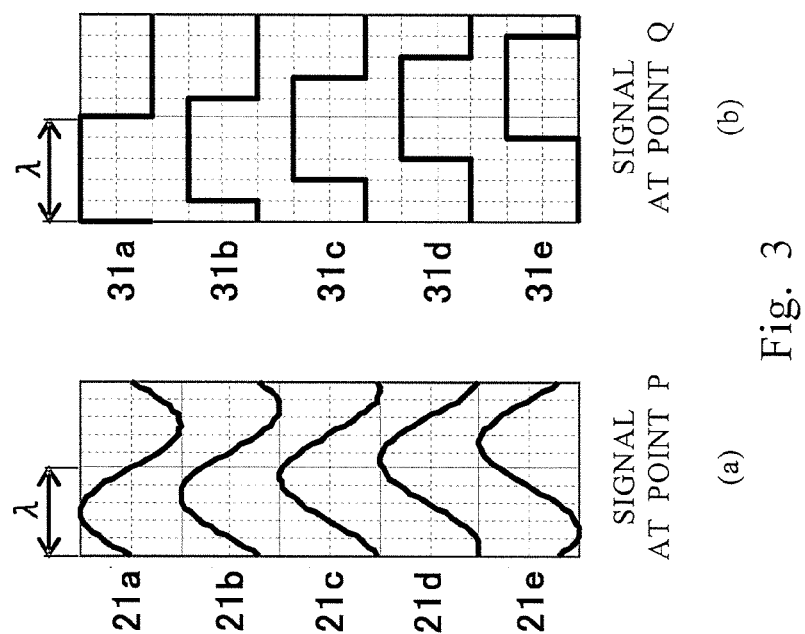
FIGS. 3a and 3b are output waveform diagrams of the magnetosensitive device and a pulse generator at the time when the magnetosensitive device moves relative to a magnetized scale according to the first embodiment of the present invention.

FIG. 3 are output waveform diagrams of the magnetosensitive device 2 and the pulse generator 31 at the time when the magneto sensitive device 2 moves relative to the magnetized scale 1a according to the first embodiment of the present invention.

In FIG. 3(a), n output waveforms of the first magnetosensitive elements 21a to 21e at the point P of FIG. 2 at the time when the magnetosensitive device 2 moves relative to the magnetized scale 1a are shown. Depending on characteristics of the magnetosensitive device 2 and the magnetized scale 1a to be used, in general, the output waveforms of the first magnetosensitive elements 21a to 21e are substantially sinusoidal waveforms with a period 2λ as shown in FIG. 3(a). Further, the n output waveforms of the first magnetosensitive elements 21a to 21e in this case are sequentially shifted in phase from one another by the magnetosensitive element pitch P=λ/n.

Further, in FIG. 3(b), n output waveforms of the pulse generator 31 at the point Q of FIG. 2 at the time when the magnetosensitive device 2 moves relative to the magnetized scale 1a are shown. The pulse generator 31 converts the outputs of the first magnetosensitive elements 21a to 21e into pulse outputs 31a to 31e with a duty ratio of almost 50% as shown in FIG. 3(b). The n output waveforms of the pulse outputs 31a to 31e are also similarly sequentially shifted in phase from one another by the magnetosensitive element pitch P=λ/n.

Next, the Hi/Lo determiner 32 makes a Hi/Lo determination on the pulse outputs 31a to 31e output from the pulse generator 31 to obtain binary values, and outputs the obtained binary values to the internal magnetic pole position calculator 33. Note that, the pulse generator 31 may be omitted so that the outputs of the first magnetosensitive elements 21a to 21e are input directly to the Hi/Lo determiner 32.

Figure 4:
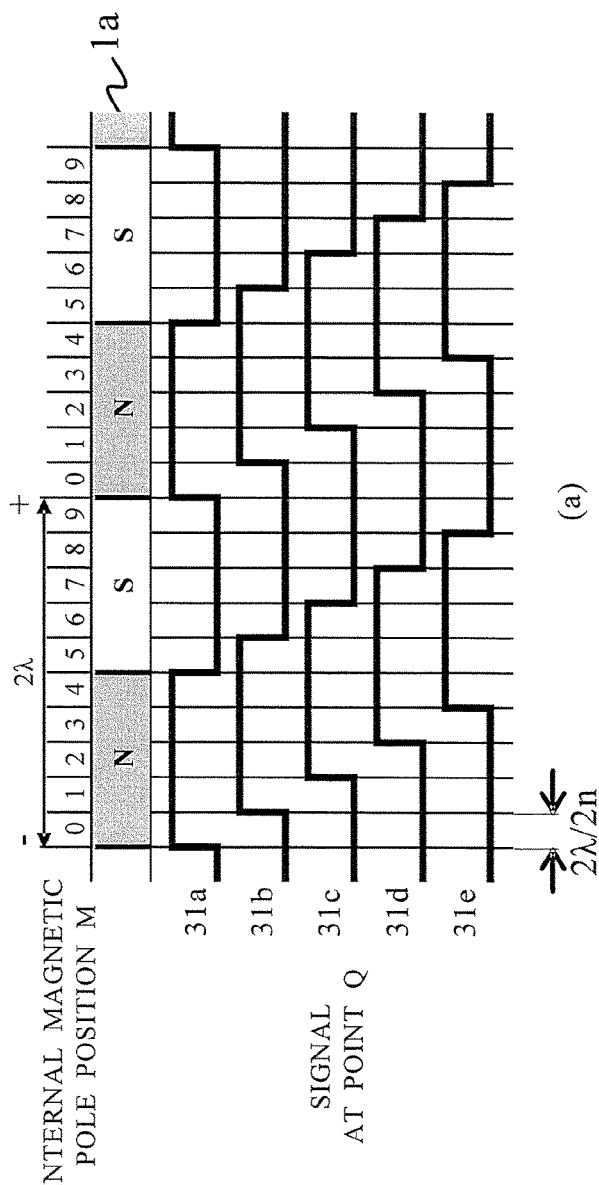
FIGS. 4a and 4b are exemplary diagrams of outputs of the pulse generator and a Hi/Lo determiner at the time when the magnetosensitive device moves relative to the magnetized scale according to the first embodiment of the present invention.

FIG. 4 are exemplary diagrams of the outputs of the pulse generator 31 and the Hi/Lo determiner 32 at the time when the magnetosensitive device 2 moves relative to the magnetized scale 1a according to the first embodiment of the present invention.

FIG. 4(a) is a timing chart of the n pulse outputs 31a to 31e that are output from the pulse generator 31 when the magnetosensitive device 2 moves relatively within the magnetic pole pair width 2λ. In this case, an internal magnetic pole position M on the horizontal axis of FIG. 4(a) represents a relative position of the magnetosensitive device 2 with respect to the magnetized scale 1a within the magnetic pole pair width 2λ.

Further, FIG. 4(b) is a table of Hi/Lo patterns of Hi/Lo outputs 32a to 32e for 2n internal magnetic pole positions M at the time when the magnetosensitive device 2 moves relatively within the magnetic pole pair width 2λ.

From FIG. 4(a) and FIG. 4(b), it is understood that the Hi/Lo outputs 32a to 32e change with the period of the magnetic pole pair width 2λ. Further, it is understood that the Hi/Lo outputs 32a to 32e all have different Hi/Lo patterns for the 2n internal magnetic pole positions M within the magnetic pole pair width 2λ.

Then, the internal magnetic pole position calculator 33 creates the table as shown in FIG. 4(b) (hereinafter referred to as "position calculation table") in advance, and stores the created table in a storage unit (not shown) in the position calculation circuit 3, to thereby calculate the internal magnetic pole position M based on the Hi/Lo patterns of the Hi/Lo outputs 32a to 32e.

For example, when all the Hi/Lo outputs 32a to 32e are Hi, the internal magnetic pole position calculator 33 determines that the magnetosensitive device 2 is located at the internal magnetic pole position M of "4". Further, when all the signals of the Hi/Lo outputs 32a to 32e are Lo, the internal magnetic pole position calculator 33 determines that the magnetosensitive device 2 is located at the internal magnetic pole position M of "9".

Next, the shift operation section 34a calculates a shift (increase/decrease) of the relative position in the unit of the magnetic pole pair width 2λ based on information of the internal magnetic pole position M output from the internal magnetic pole position calculator 33 and the previous internal magnetic pole position M stored in the internal magnetic pole position memory 34b.

For example, when the internal magnetic pole position M of the magnetosensitive device 2 has changed from "9" to "0", the shift operation section 34a determines that the magnetosensitive device 2 has shifted to another magnetic pole pair that is adjacent to the magnetic pole pair concerned in the direction of "+". On the other hand, when the internal magnetic pole position M has changed from "0" to "9", the shift operation section 34a determines that the magnetosensitive device 2 has shifted to another magnetic pole pair that is adjacent to the magnetic pole pair concerned in the direction of "−".

Next, based on the result of calculation in the shift operation section 34a, the magnetic pole pair position calculator 35a calculates a magnetic pole pair position L (L is an integer), which is a relative position of the magnetosensitive device 2 with respect to the magnetized scale 1a in the unit of the magnetic pole pair width 2λ. Specifically, the magnetic pole pair position calculator 35a calculates which of the magnetic pole pairs the magnetosensitive device 2 is located at.

For example, when the magnetosensitive device 2 has shifted in the direction of "+" by 1, the magnetic pole pair position calculator 35a increments the magnetic pole pair position L (L is an integer) stored in the magnetic pole pair position memory 35b by 1. On the other hand, when the magnetosensitive device 2 has shifted in the direction of "−" by 1, the magnetic pole pair position calculator 35a decrements the magnetic pole pair position L by 1.

Note that, in the magnetic pole pair position calculator 35a, a magnetic pole pair position initial value stored in the magnetic pole pair position initial value memory 35c in advance may be used as an initial value of the magnetic pole pair position so that the magnetic position detection device is operated for use in absolute position detection.

Next, based on the results of calculation in the internal magnetic pole position calculator 33 and the magnetic pole pair position calculator 35a, the position calculator 36 calculates the relative position of the magnetosensitive device 2 with respect to the magnetized scale 1a as the sum of the magnetic pole pair position L and the internal magnetic pole position M, and outputs the calculated relative position to the outside.

Note that, the processing of calculating the relative position by the position calculation circuit 3 described above may be performed in synchronization with the rising or falling of the pulse outputs 31a to 31e. Alternatively, the processing may be started for each fixed period equal to or more than "(magnetosensitive element pitch P)/V", where V represents a maximum relative movement speed of the magnetosensitive device 2 with respect to the magnetized scale 1a.

As described above, according to the first embodiment, the magnetized scale in which the magnetic pole pairs each formed of the N pole and the S pole are arranged with the period of the magnetic pole pair width 2λ and the magnetosensitive device in which the n magnetosensitive elements are arranged with the magnetosensitive element pitch P so that λ=nP is established are arranged so as to be opposed to each other with a predetermined air gap therebetween, and the change of the magnetic field measured by the magnetosensitive device is analyzed to calculate the relative position of the magnetosensitive device with respect to the magnetized scale.

As a result, the simple magnetic position detection device and the simple magnetic position detection method, which are capable of calculating the relative position of the magnetosensitive device with respect to the magnetized scale at the position detection resolution of P=λ/n corresponding to the number of the magnetosensitive elements to be used, can be obtained.

Second Embodiment

In a second embodiment of the present invention, an introduction is given of a method for obtaining another magnetic position detection device having the same effect as in the magnetic position detection device according to the above-mentioned first embodiment by using a magnetic scale formed of a soft magnetic material and a magnet instead of using the magnetized scale 1a.

Figure 5:
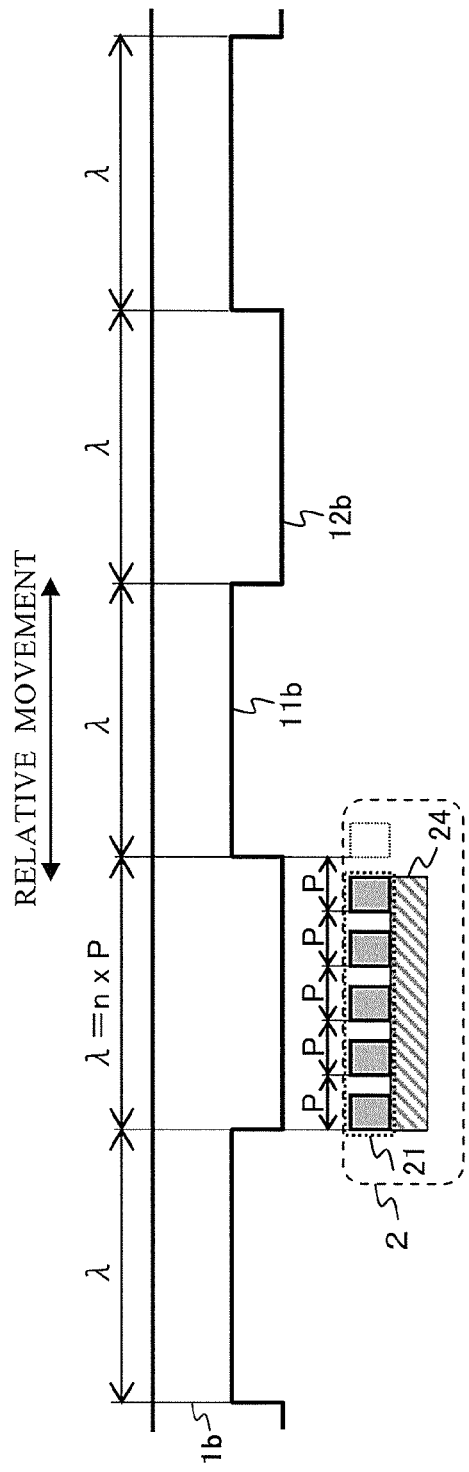
FIG. 5 is an exemplary diagram of a configuration of a magnetic position detection device according to a second embodiment of the present invention.

FIG. 5 is an exemplary diagram of a configuration of a magnetic position detection device according to the second embodiment of the present invention. The magnetic position detection device according to the second embodiment has a feature of including a magnetic scale 1b and a magnet 24 instead of the magnetized scale 1a according to the above-mentioned first embodiment.

The magnetic scale 1b is formed of a soft magnetic material. As illustrated in FIG. 5, the magnetic scale 1b is formed in a manner that magnetic pole pairs each having a width 2λ and each being formed of a recessed portion 11b having a width λ and a protruding portion 12b having the width λ are arranged with equal pitches of a period of the magnetic pole pair width 2λ.

Further, a magnetosensitive device 2 according to the second embodiment further includes the magnet 24 in addition to the first magnetosensitive element group 21 according to the above-mentioned first embodiment. The magnet 24 is fixed close to the first magnetosensitive element group 21 so as not to change a relative position thereof with respect to the first magnetosensitive element group 21.

The recessed portion 11b and the protruding portion 12b are magnetized by an external magnetic field of the magnet 24, and hence the magnetic scale 1b forms a magnetic field in a movement path of the magnetosensitive device 2, which is arranged so as to be opposed to the magnetic scale 1b with a predetermined air gap therebetween, so that the magnetic field changes in intensity and direction with the period of the magnetic pole pair width 2λ.

As a result, the position calculation circuit 3 can calculate a relative position between the magnetosensitive device 2 and the magnetic scale 1b based on an output value of the magnetosensitive device 2 with use of the same procedures as in the above-mentioned first embodiment described above with reference to FIG. 2 to FIG. 4.

As described above, according to the second embodiment, the magnetic scale in which the magnetic pole pairs each formed of the recessed portion and the protruding portion are arranged with the period of the magnetic pole pair width 2λ and the magnetosensitive device in which the n magnetosensitive elements are arranged with the magnetosensitive element pitch P so that λ=nP is established are arranged so as to be opposed to each other with a predetermined air gap therebetween, and the change of the magnetic field measured by the magnetosensitive device is analyzed to calculate the relative position of the magnetosensitive device with respect to the magnetic scale.

As a result, the simple magnetic position detection device and the simple magnetic position detection method, which are capable of calculating the relative position of the magnetosensitive device with respect to the magnetic scale at the position detection resolution of P=λ/n corresponding to the number of the magnetosensitive elements to be used, can be obtained.

Third Embodiment

In a third embodiment of the present invention, an introduction is given of a first method capable of improving the S/N ratio of the output of the magnetosensitive device 2 by forming the magnetosensitive device 2 with two magnetosensitive element groups.

Figure 6:
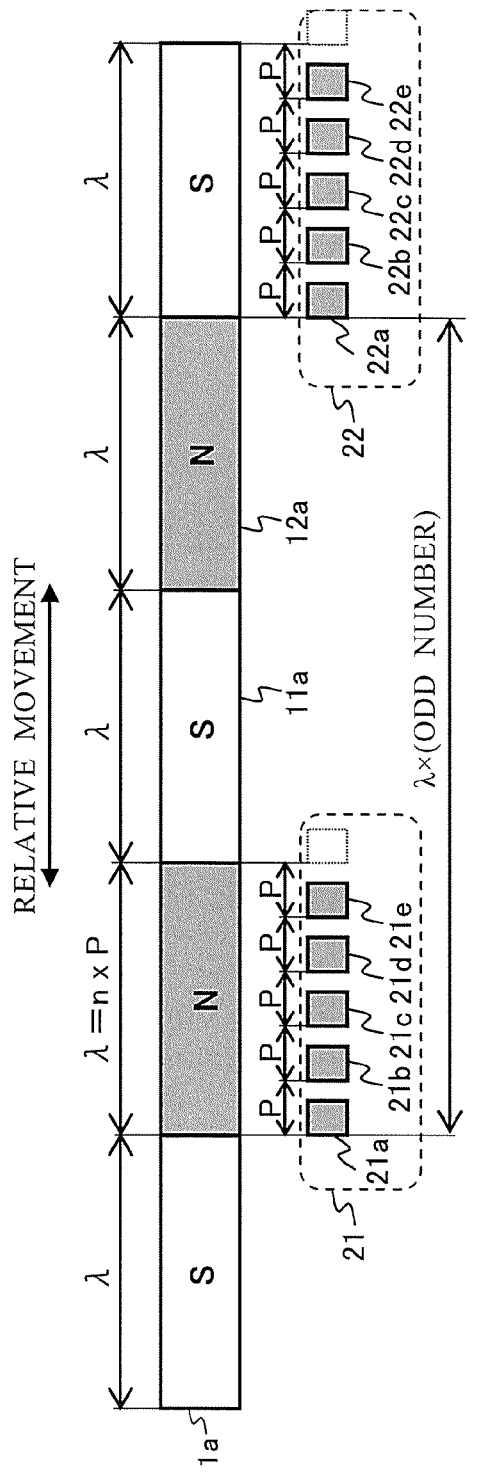
FIG. 6 is an exemplary diagram of a configuration of a magnetic position detection device according to a third embodiment of the present invention.

FIG. 6 is an exemplary diagram of a configuration of a magnetic position detection device according to the third embodiment of the present invention. The magnetosensitive device 2 according to the third embodiment has a feature of further including a second magnetosensitive element group 22 in addition to the first magnetosensitive element group 21 according to the above-mentioned first embodiment.

The second magnetosensitive element group 22 is formed in a manner that n second magnetosensitive elements 22a to 22e having magnetosensitive characteristics of the same phase as in the first magnetosensitive elements 21a to 21 e are arranged with equal magnetosensitive element pitches P so that λ=nP is established. Further, the second magnetosensitive element group 22 is arranged at a relative position away from the first magnetosensitive element group 21 by Q*λ, where Q is an odd number.

Specifically, the first magnetosensitive elements 21a to 21e and the second magnetosensitive elements 22a to 22e are arranged so that the pitch between 21a and 22a, the pitch between 21b and 22b, the pitch between 21c and 22c, the pitch between 21d and 22d, and the pitch between 21e and 22e are all Q*λ.

Figure 7:
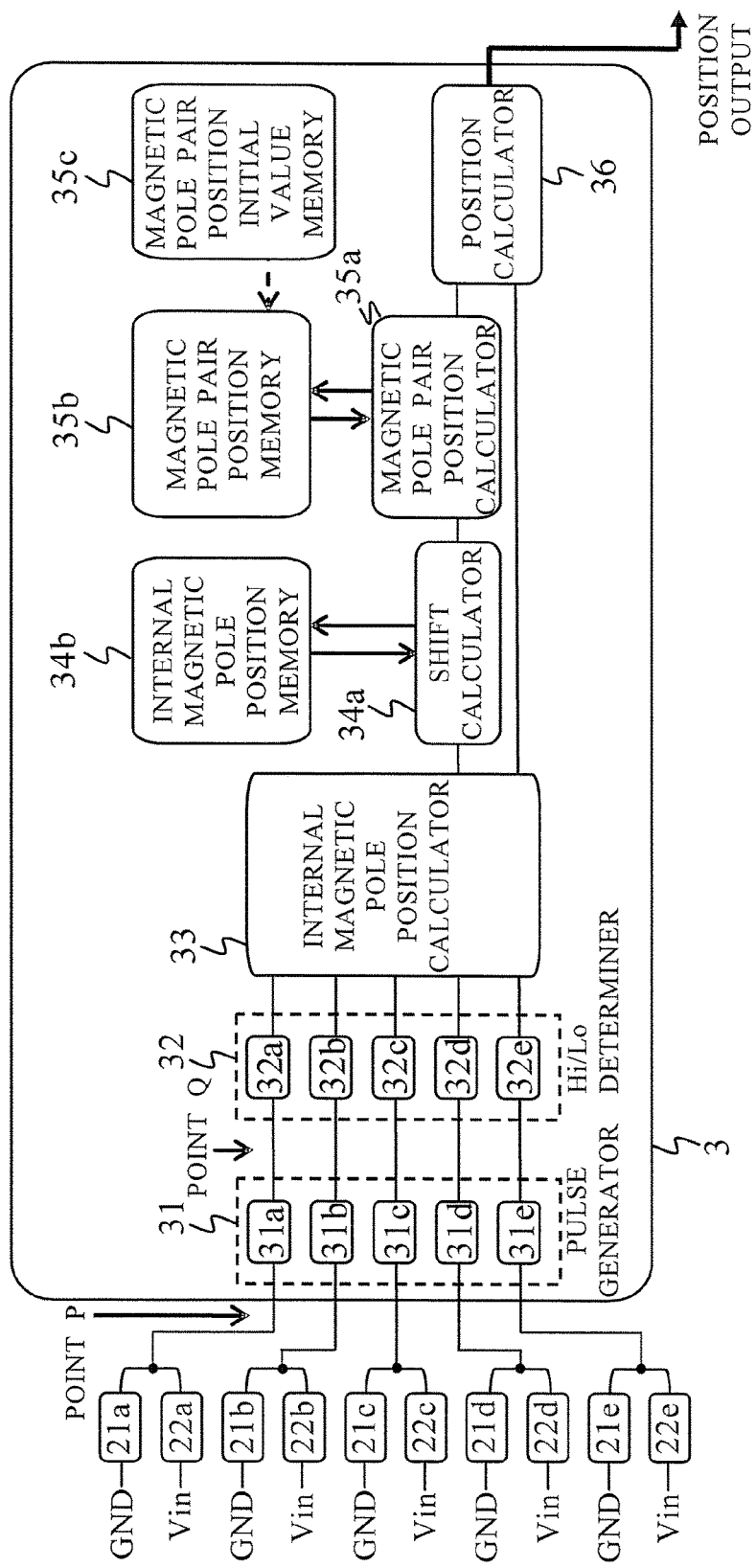
FIG. 7 is an exemplary diagram of a circuit configuration of an output of a magnetosensitive device according to the third embodiment of the present invention.

FIG. 7 is an exemplary diagram of a circuit configuration of an output of the magnetosensitive device 2 according to the third embodiment of the present invention. In FIG. 7, only the circuit configuration of the output of the magnetosensitive device 2 differs from that in the above-mentioned first embodiment. On the other hand, the position calculation circuit 3 is the same as that in FIG. 2 according to the above-mentioned first embodiment.

Each pair of the first magnetosensitive elements 21a to 21e and the second magnetosensitive elements 22a to 22e, which are spaced apart from each other by Q*λ, forms a half-bridge circuit in which one of the pair is wired to GND and the other is wired to a power supply Vin. Then, the half-bridge circuits output bridge voltages in parallel, which are voltages at nodes between the first magnetosensitive elements 21a to 21e and the second magnetosensitive elements 22a to 22e of the respective half-bridge circuits.

Thus, for example, when the first magnetosensitive element group 21 approaches the N pole 12a, the second magnetosensitive element group 22 approaches the S pole 11a, and hence the first magnetosensitive elements 21a to 21e and the second magnetosensitive elements 22a to 22e are always applied with magnetic fields of opposite phases.

As a result, the outputs of the first magnetosensitive elements 21a to 21e and the outputs of the second magnetosensitive elements 22a to 22e are opposite in phase from each other, and an output signal of each half-bridge circuit becomes twice as large as when the magnetosensitive device 2 is formed of a single magnetosensitive element group. Further, in-phase noise superimposed on the first magnetosensitive element group 21 and in-phase noise superimposed on the second magnetosensitive element group 22 are canceled with each other, and hence the output noise is reduced.

As described above, according to the third embodiment, in the magnetic position detection device including the magnetic scale, the magnetosensitive device is formed of two magnetosensitive element groups, and hence the S/N ratio of the output of the magnetosensitive device can be improved.

Fourth Embodiment

In a fourth embodiment of the present invention, an introduction is given of a second method capable of improving the S/N ratio of the output of the magnetosensitive device 2 by forming the magnetosensitive device 2 with two magnetosensitive element groups.

Figure 8:
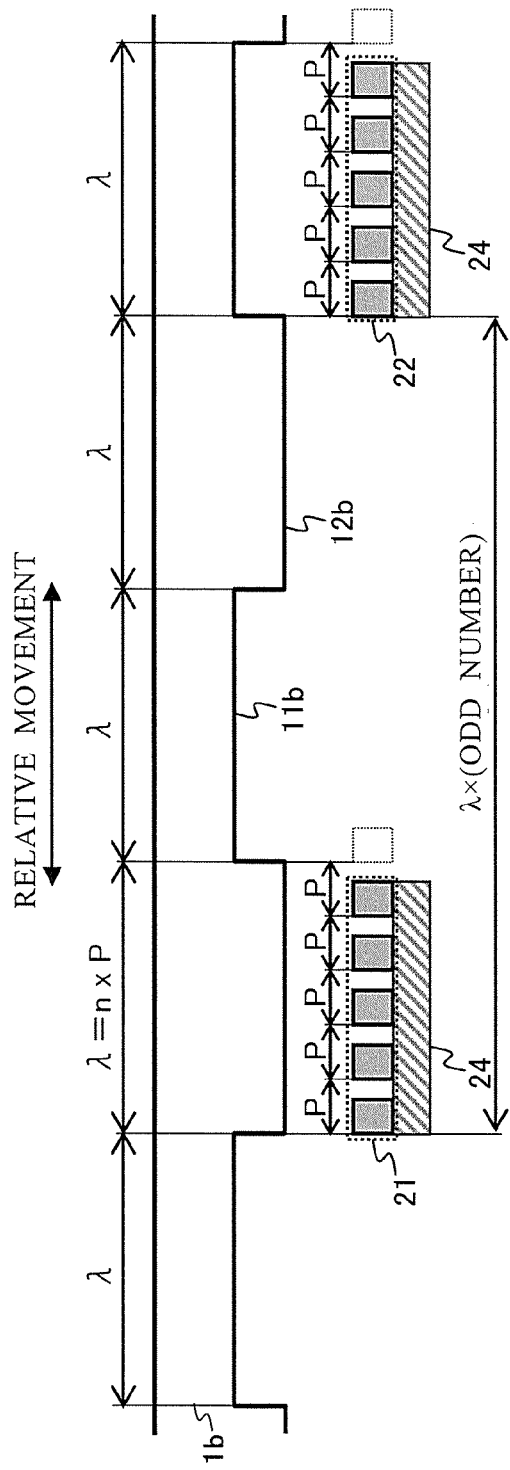
FIG. 8 is an exemplary diagram of a configuration of a magnetic position detection device according to a fourth embodiment of the present invention.

FIG. 8 is an exemplary diagram of a magnetic position detection device according to the fourth embodiment of the present invention. A magnetosensitive device 2 according to the fourth embodiment has a feature of further including the second magnetosensitive element group 22 in addition to the first magnetosensitive element group 21 according to the above-mentioned second embodiment.

The method of forming the magnetosensitive device 2 with two magnetosensitive element groups having magnetosensitive characteristics of the same phase, which is described above with reference to FIG. 6 according to the above-mentioned third embodiment, can be applied also to the magnetic position detection device including the magnetic scale 1b and the magnet 24 instead of the magnetized scale 1a as illustrated in FIG. 5 according to the above-mentioned second embodiment. Also in this case, the same effect as that in the above-mentioned third embodiment is obtained.

As described above, according to the fourth embodiment, in the magnetic position detection device including the magnetic scale, the magnetosensitive device is formed of two magnetosensitive element groups, and hence the S/N ratio of the output of the magnetosensitive device can be improved.

Fifth Embodiment

In a fifth embodiment of the present invention, an introduction is given of a third method capable of improving the S/N ratio of the output of the magnetosensitive device 2 by forming the magnetosensitive device 2 with two magnetosensitive element groups.

Figure 9:
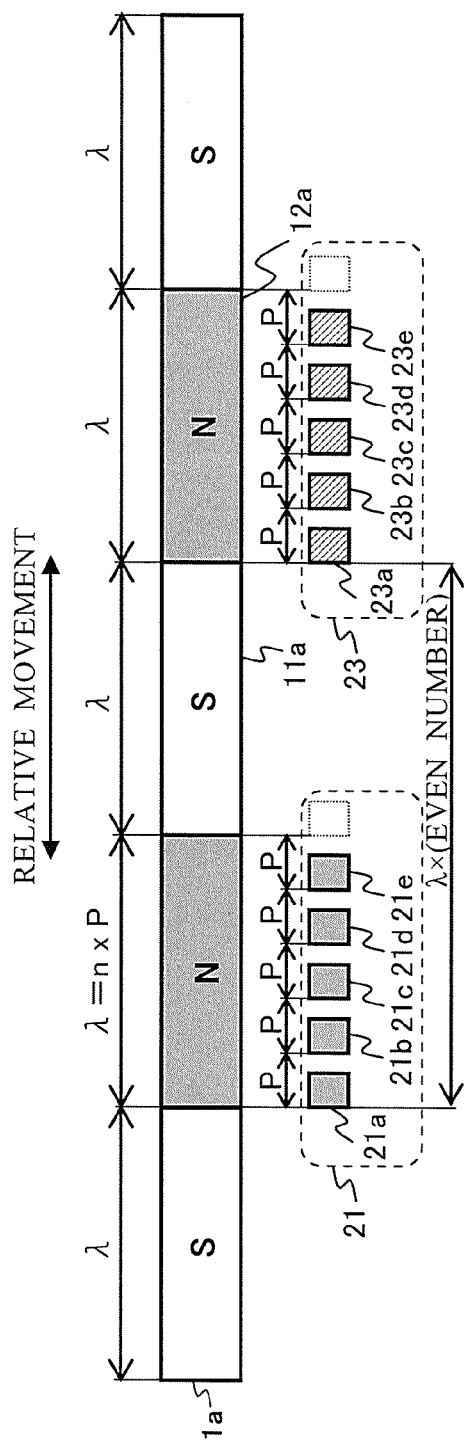
FIG. 9 is an exemplary diagram of a configuration of a magnetic position detection device according to a fifth embodiment of the present invention.

FIG. 9 is an exemplary diagram of a magnetic position detection device according to the fifth embodiment of the present invention. A magnetosensitive device 2 according to the fifth embodiment has a feature of including a third magnetosensitive element group 23 instead of the second magnetosensitive element group 22 according to the above-mentioned third embodiment.

The third magnetosensitive element group 23 is formed in a manner that n third magnetosensitive elements 23a to 23e having magnetosensitive characteristics of a phase opposite to that of the first magnetosensitive elements 21a to 21e are arranged with equal magnetosensitive element pitches P so that $\lambda = nP$ is established. Further, the third magnetosensitive element group 23 is arranged at a relative position away from the first magnetosensitive element group 21 by $R*\lambda$, where R is an even number.

Specifically, the first magnetosensitive elements 21a to 21e and the third magnetosensitive elements 23a to 23e are arranged so that the pitch between 21a and 23a, the pitch between 21b and 23b, the pitch between 21c and 23c, the pitch between 21d and 23d, and the pitch between 21e and 23e are all $R*\lambda$.

As a result, for example, when the first magnetosensitive element group 21 approaches the N pole 12a, the third magnetosensitive element group 23 also similarly approaches the N pole 12a, and hence the first magnetosensitive elements 21a to 21e and the third magnetosensitive elements 23a to 23e are always applied with magnetic fields of the same phase.

However, the third magnetosensitive elements 23a to 23e have the magnetosensitive characteristics of the phase opposite to that of the first magnetosensitive elements 21a to 21e, and hence the outputs of the first magnetosensitive elements 21a to 21e and the outputs of the third magnetosensitive elements 23a to 23e are opposite in phase from each other as in the case of the above-mentioned third embodiment.

Figure 10:
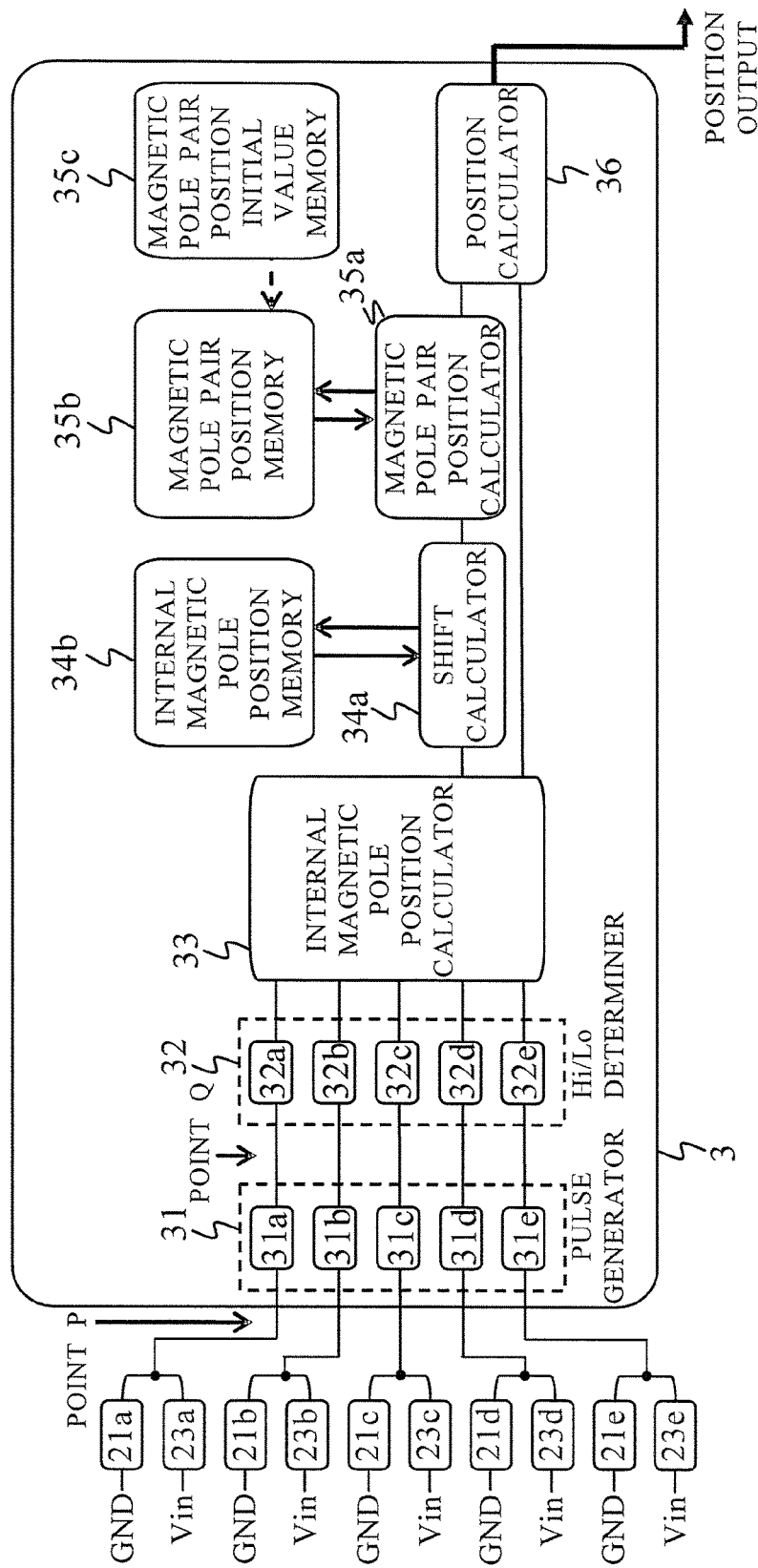
FIG. 10 is an exemplary diagram of a circuit configuration of an output of a magnetosensitive device according to the fifth embodiment of the present invention.

FIG. 10 is an exemplary diagram of a circuit configuration of an output of the magnetosensitive device 2 according to the fifth embodiment of the present invention. The circuit configuration of the output of the magnetosensitive device 2 and the circuit configuration of the position calculation circuit 3 illustrated in FIG. 10 are the same as those illustrated in FIG. 7 according to the above-mentioned third embodiment.

In this manner, even when the magnetosensitive device 2 including the third magnetosensitive element group 23 instead of the second magnetosensitive element group 22 according to the above-mentioned third embodiment is used, the same effect as that in the case of the above-mentioned third embodiment can be obtained with the use of the same circuit configuration according to the above-mentioned third embodiment without any modification.

As described above, according to the fifth embodiment, in the magnetic position detection device including the magnetic scale, the magnetosensitive device is formed of two magnetosensitive element groups, and hence the S/N ratio of the output of the magnetosensitive device can be improved.

Note that, a relative distance $R*\lambda$ between the first magnetosensitive element group 21 and the third magnetosensitive element group 23 may be R=0. In this case, the first magnetosensitive elements 21a to 21e and the third magnetosensitive elements 23a to 23e are arranged at the same relative positions with respect to the magnetic scale, but the same effect as that in the case of R≠0 can be obtained by arranging the first magnetosensitive elements 21a to 21e and the third magnetosensitive elements 23a to 23e with different air gaps from the magnetic scale.

Sixth Embodiment

In a sixth embodiment of the present invention, an introduction is given of a fourth method capable of improving the S/N ratio of the output of the magnetosensitive device 2 by forming the magnetosensitive device 2 with two magnetosensitive element groups.

Figure 11:
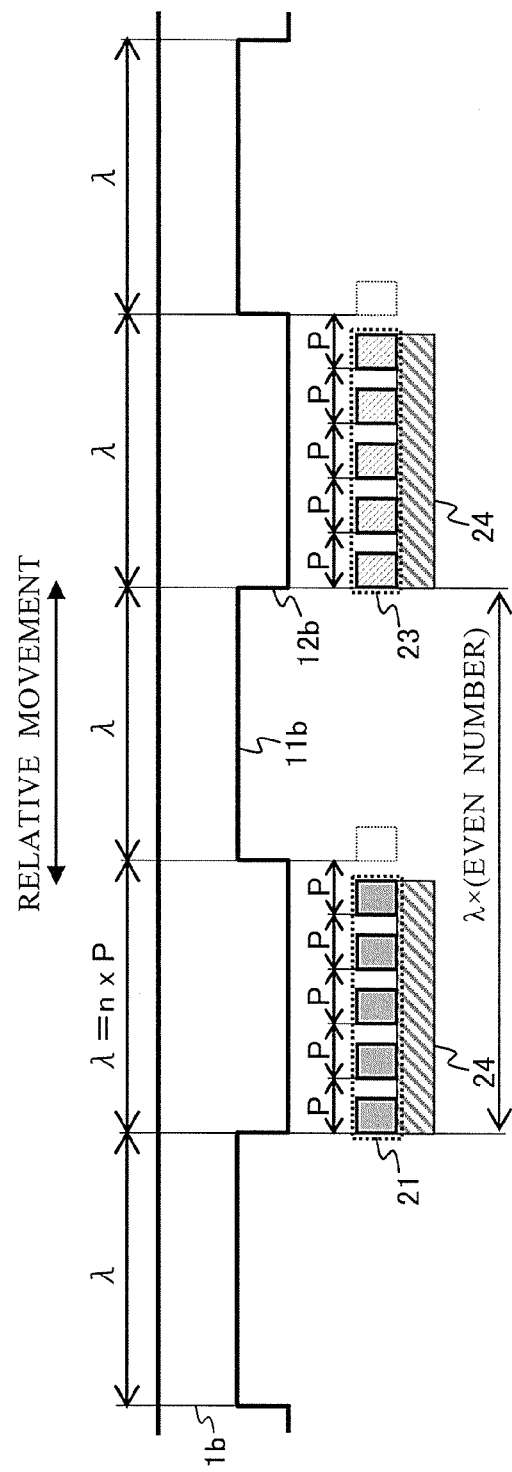
FIG. 11 is an exemplary diagram of a configuration of a magnetic position detection device according to a sixth embodiment of the present invention.

FIG. 11 is an exemplary diagram of a magnetic position detection device according to the sixth embodiment of the present invention. A magnetosensitive device 2 according to the sixth embodiment has a feature of further including a third magnetosensitive element group 23 in addition to the first magnetosensitive element group 21 according to the above-mentioned second embodiment.

The method of forming the magnetosensitive device 2 with two magnetosensitive element groups having magnetosensitive characteristics of opposite phases, which is described above with reference to FIG. 9 according to the above-mentioned fifth embodiment, can be applied also to the magnetic position detection device including the magnetic scale 1b and the magnet 24 instead of the magnetized scale 1a as illustrated in FIG. 5 according to the above-mentioned second embodiment. Also in this case, the same effect as that in the above-mentioned fifth embodiment is obtained.

As described above, according to the sixth embodiment, in the magnetic position detection device including the magnetic scale, the magnetosensitive device is formed of two magnetosensitive element groups, and hence the S/N ratio of the output of the magnetosensitive device can be improved.

Seventh Embodiment

In a seventh embodiment of the present invention, an introduction is given of a first method capable of correcting an error of a relative position of the magnetosensitive device 2 by forming a magnetic pole disturbing portion 1c serving as a position reference point in the magnetized scale 1a or the magnetic scale 1b.

Figure 12:
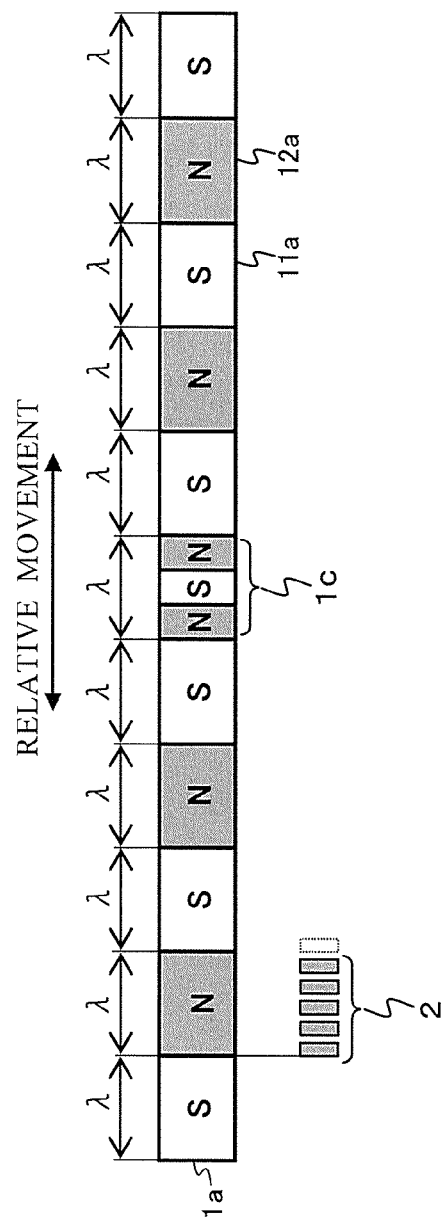
FIG. 12 is an exemplary diagram of a configuration of a magnetic position detection device according to a seventh embodiment of the present invention.

FIG. 12 is an exemplary diagram of a configuration of a magnetic position detection device according to the seventh embodiment of the present invention. The magnetized scale 1a according to the seventh embodiment has a feature of including the magnetic pole disturbing portion 1c serving as a position reference point.

As illustrated in FIG. 12, the magnetic pole disturbing portion 1c is formed of, for example, an N pole 12a not having the width 2, an S pole 11a not having the width $\lambda$, or a combination thereof. Then, when the magnetosensitive device 2 approaches the magnetic pole disturbing portion 1c, the periodicity of the output of the magnetosensitive device 2 is changed depending on the width of the N pole 12a or the S pole 11a of the magnetic pole pair.

With this configuration, the position calculation circuit 3 uses the magnetic pole disturbing portion 1c as a position reference point. For example, even if an error occurs in the relative position due to extrinsic noise, a calculation error, or the like, the relative position can be corrected through detection of the change of the periodicity of the output specific to the magnetic pole disturbing portion 1c.

Specifically, for example, the previous relative position is reset each time the magnetic pole disturbing portion 1c is detected, and the relative position is newly set again so that the position at which the magnetic pole disturbing portion 1c is detected serves as an absolute reference position.

Note that, the same effect is obtained even when the magnetosensitive device 2 includes the magnetic scale 1b and the magnet 24 instead of the magnetized scale 1a. Further, instead of using the magnetic pole disturbing portion 1c, another detection mechanism may be mounted to detect the position reference point.

As described above, according to the seventh embodiment, the magnetic pole disturbing portion serving as a position reference point is formed in the magnetized scale or the magnetic scale, and hence the relative position can be corrected to prevent an error of the relative position from being accumulated.

Eighth Embodiment

In an eighth embodiment of the present invention, an introduction is given of a second method capable of correcting an error of a magnetic pole pair position L by forming a magnetic pole disturbing portion 1c serving as a position reference point in the magnetized scale 1a or the magnetic scale 1b.

Figure 13:
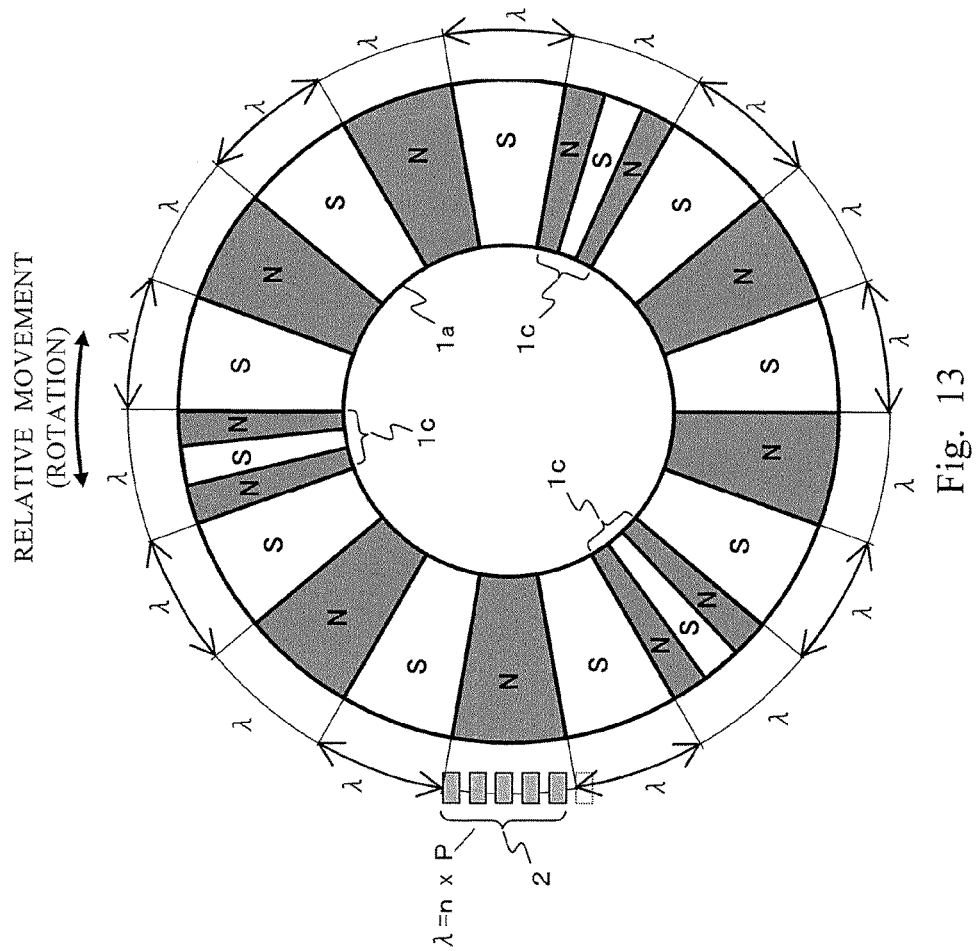
FIG. 13 is an exemplary diagram of a configuration of a magnetic position detection device according to an eighth embodiment of the present invention.

FIG. 13 is an exemplary diagram of a configuration of a magnetic position detection device according to the eighth embodiment of the present invention. A magnetized scale 1a according to the eighth embodiment has a feature in that the magnetic pole disturbing portions 1c are formed at three positions along the circumference of a circle with a pitch of 120°.

As illustrated in FIG. 13, the magnetized scale 1a has the magnetic pole disturbing portion 1c, and hence when the magnetosensitive device 2 rotates relatively to approach the magnetic pole disturbing portion 1c, the output of the magnetosensitive device 2 is disturbed. Thus, the position calculation circuit 3 can detect the magnetic pole disturbing portion 1c on the magnetized scale 1a. Note that, in this case, the magnetic pole pair width 2λ and the magnetosensitive element pitch P are set as angle values.

Such a magnetic position detection device having the structure in which the magnetized scale 1a is arranged in a circle is effective particularly for a rotational angle sensor for use in motor control. For example, for a 6-pole motor having three magnetic pole pairs each formed of the N pole 12a and the S pole 11a, the magnetic pole pair position L can be corrected with a pitch of 120° to accurately perform the same rotational control with the pitch of 120°.

Note that, the same effect is obtained even when the magnetosensitive device 2 includes the magnetic scale 1b and the magnet 24 instead of the magnetized scale 1a. Further, for a 2Z-pole motor having Z magnetic pole pairs, the magnetic pole disturbing portions 1c serving as position reference points only need to be formed at Z positions along the circumference of a circle with a pitch of 360°/Z.

As described above, according to the eighth embodiment, the magnetic pole disturbing portions serving as position reference points are formed at three positions along the circumference of a circle with the pitch of 120°. As a result, the relative position can be corrected with the pitch of 120° to accurately perform the same rotational control with the pitch of 120°.

Ninth Embodiment

In a ninth embodiment of the present invention, a description is given of a case where magnetosensitive devices 2 are formed on a single semiconductor chip 20 in order to improve the position detection resolution of the magnetosensitive device 2.

Figure 14:
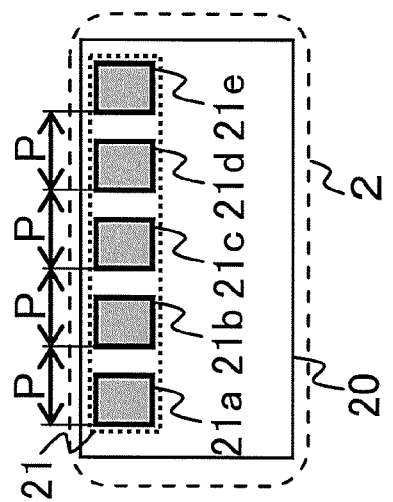
FIG. 14 is an exemplary diagram of a magnetosensitive device according to a ninth embodiment of the present invention.

FIG. 14 is an exemplary diagram of the magnetosensitive device 2 according to the ninth embodiment of the present invention. As illustrated in FIG. 14, the magnetosensitive device 2 according to the ninth embodiment has a feature of being formed on the single semiconductor chip 20 with use of a semiconductor process.

In the above-mentioned first to eighth embodiments, the magnetic pole pair having the magnetic pole pair width 2λ is detected with use of the n first magnetosensitive elements 21a to 21e, to thereby realize the position detection resolution of $P=\lambda/n$. Thus, in order to improve the position detection resolution, it is desired that the magnetosensitive element pitches P be small and equal to one another.

Then, in the eighth embodiment, as illustrated in FIG. 14, the semiconductor process is used to form the magnetosensitive devices 2 collectively on the semiconductor chip 20, to thereby arrange the first magnetosensitive elements 21a to 21e with the reduced and equal magnetosensitive element pitches $P=\lambda$.

As a result, the position detection resolution of the magnetosensitive device 2 can be improved. Further, fluctuations in inclination and the like among the elements can be suppressed to achieve the uniform magnetosensitive characteristics and achieve the uniform phase difference of the outputs, to thereby improve measurement accuracy of the internal magnetic pole position M.

Note that, the magnetosensitive devices 2 are formed on the single semiconductor chip 20 in the above description, but at least one of the first magnetosensitive element group 21, the second magnetosensitive element group 22, and the third magnetosensitive element group 23 may be formed on the semiconductor chip 20.

As described above, according to the ninth embodiment, the magnetosensitive devices are formed on the single semiconductor chip, and hence the measurement accuracy of the internal magnetic pole position M can be improved to improve the position detection resolution.

Note that, a Hall element, a magnetoresistive element, or the like can be used as the magnetosensitive elements described in the above-mentioned first to ninth embodiments, but a spin-valve magnetoresistive element is preferred.

In particular, the use of a tunneling magnetoresistive element can reduce the element size, and hence the magnetosensitive element pitch $P=\lambda/n$ can be reduced to be equal to or less than a practical magnetic pole limit length $\lambda 0=100$ μm of the magnetized scale 1a, for example. As a result, the position detection resolution can be improved.

Further, in the drawings referred to in the above description, an example in which the first magnetosensitive element group 21, the second magnetosensitive element group 22, and the third magnetosensitive element group 23 are each formed of five first magnetosensitive elements 21a to 21e is illustrated, but the number n of the magnetosensitive elements arranged is not limited to 5. The number n only needs to be a natural number of 2 or more.

Further, in the above-mentioned first to seventh embodiments, the relative movement between the magnetosensitive device 2 and the magnetized scale 1a or the magnetic scale 1b is assumed to be linear movement, but may be rotational movement. In the case of rotational movement, the magnetized scale 1a or the magnetic scale 1b is arranged in a circle, and a relative angle between the magnetosensitive device 2 and the magnetized scale 1a or the magnetic scale 1b is calculated instead of a relative position therebetween.

The invention claimed is:

1. A magnetic position detection device, comprising:
   a magnetized scale in which magnetic pole pairs each having a width 2λ and each being formed of a first magnetic portion having a width λ, and a second magnetic portion having the width λ, which have different magnetic properties, are arranged at equal pitches of a period of the magnetic pole pair width 2λ;
   a magnetosensitive device arranged so as to be opposed to the magnetized scale with a predetermined air gap therebetween, the magnetosensitive device being configured to move relatively in a direction of arrangement of the magnetized scale within a magnetic field formed by the magnetized scale while maintaining the air gap, and to measure a change of the magnetic field due to the relative movement with use of magnetosensitive elements; and
   a position calculation circuit configured to analyze an output value of the magnetosensitive device, to thereby calculate a relative position between the magnetosensitive device and the magnetized scale,
   wherein the magnetosensitive device comprises, as the magnetosensitive elements, a first magnetosensitive element group in which n first magnetosensitive elements, where n is a natural number of 2 or more, are arranged at equal magnetosensitive element pitches P so that λ=nP is established, and the n first magnetosensitive elements of the first magnetosensitive element group are configured to output results of measuring the change of the magnetic field due to the relative movement in parallel, and
   wherein the position calculation circuit analyzes output values that are output from the magnetosensitive device in parallel, to thereby calculate the relative position between the magnetosensitive device and the magnetized scale as a position detection resolution of λ/n.

2. A magnetic position detection device according to claim 1, wherein the position calculation circuit comprises:
   a Hi/Lo determiner configured to make a Hi/Lo determination on each of the n output values output from the magnetosensitive device in parallel to obtain binary values, and output the obtained binary values as n Hi/Lo outputs; and
   an internal magnetic pole position calculator configured to calculate, based on a position calculation table in which a relationship between 2n internal magnetic pole positions M, where M represents 2n integers of 0 or more and 2n−1 or less, which are the relative positions within the magnetic pole pair width 22, and a pattern of the n Hi/Lo outputs is defined in advance, the internal magnetic pole position M of the magnetosensitive device corresponding to the n Hi/Lo outputs as the position detection resolution of λ/n.

3. A magnetic position detection device according to claim 2, wherein the position calculation circuit further comprises:
   a shift calculator configured to determine, based on the internal magnetic pole position M output from the internal magnetic pole position calculator and change information of a previous internal magnetic pole position M stored in a memory, that the relative position of the magnetosensitive device with respect to the magnetized scale shifts to a magnetic pole pair adjacent in a direction of + when the internal magnetic pole position M shifts from 2n−1 to 0, and that the relative position of the magnetosensitive device with respect to the magnetized scale shifts to a magnetic pole pair adjacent in a direction of − when the internal magnetic pole position M shifts from 0 to 2n−1;
   a magnetic pole pair position calculator configured to perform increment and decrement operation based on a result of the determination by the shift calculator, to thereby calculate a magnetic pole pair position L, where L is an integer, which is a relative position of the magnetosensitive device with respect to the magnetized scale in a unit of the magnetic pole pair width 2λ; and
   a position calculator configured to calculate the relative position of the magnetosensitive device based on the magnetic pole pair position L and the internal magnetic pole position M.

4. A magnetic position detection device according to claim 1,
   wherein the magnetosensitive device further comprises, in addition to the first magnetosensitive element group, as the magnetosensitive elements, a second magnetosensitive element group in which n magnetosensitive elements having magnetosensitive characteristics of the same phase as in the n first magnetosensitive elements are arranged with the equal magnetosensitive element pitches P so that λ=nP is established, the second magnetosensitive element group being arranged at a relative position away from the first magnetosensitive element group by Q*λ, where Q is an odd number, and
   wherein each pair of the n magnetosensitive elements included in the first magnetosensitive element group and the n magnetosensitive elements included in the second magnetosensitive element group, which are spaced apart from each other by Q*λ, form a half-bridge circuit in which one of the each pair is wired to GND and another of the each pair is wired to a power supply Vin, and the half-bridge circuits output bridge voltages in parallel, which are voltages at nodes of the respective half-bridge circuits.

5. A magnetic position detection device according to claim 1,
   wherein the magnetosensitive device further comprises, in addition to the first magnetosensitive element group, as the magnetosensitive elements, a third magnetosensitive element group in which n magnetosensitive elements having magnetosensitive characteristics of a phase opposite to a phase of the n first magnetosensitive elements are arranged with the equal magnetosensitive element pitches P so that λ=nP is established, the third magnetosensitive element group being arranged at a relative position away from the first magnetosensitive element group by R*λ, where R is an even number, and
   wherein each pair of the n magnetosensitive elements included in the first magnetosensitive element group and the n magnetosensitive elements included in the third magnetosensitive element group, which are spaced apart from each other by R*λ, form a half-bridge circuit in which one of the each pair is wired to GND and another of the each pair is wired to a power supply Vin, and the half-bridge circuits output bridge voltages in parallel, which are voltages at nodes of the respective half-bridge circuits.

6. A magnetic position detection device according to claim 1,
   wherein the magnetized scale further comprises a magnetic pole disturbing portion that replaces the first magnetic portion or the second magnetic portion formed at a specific position, the magnetic pole disturbing portion comprising the first magnetic portion and the second magnetic portion in a mixed manner to generate a periodicity disturbance, and wherein the position calculation circuit detects a position at which the magnetic pole disturbing portion is arranged based on a periodicity disturbance of the output of the magnetosensitive device, resets a previous relative position each time the magnetic pole disturbing portion is detected, and newly sets the relative position again so that the position at which the magnetic pole disturbing portion is detected serves as an absolute reference position.

7. A magnetic position detection device according to claim 1, wherein the magnetosensitive element comprises any one of a spin-valve magnetoresistive element, a tunneling magnetoresistive element, and a spin-valve tunneling magnetoresistive element.

8. A magnetic position detection device according to claim 1, wherein the magnetosensitive element group formed of the n magnetosensitive elements are formed on a single semiconductor chip with use of a semiconductor process.

9. A magnetic position detection device according to claim 1,
wherein the magnetized scale is arranged in a line or in a circle, and
wherein the position calculation circuit analyzes an output value of the magnetosensitive device, to thereby calculate a relative linear position or a relative rotational angle between the magnetosensitive device and the magnetized scale.

10. A magnetic position detection device according to claim 1, wherein the first magnetic portion of the magnetized scale comprises an S pole, and the second magnetic portion thereof comprises an N pole.

11. A magnetic position detection device according to claim 1,
wherein the magnetized scale comprises a magnetic scale in which the first magnetic portion is formed of a recessed portion and the second magnetic portion is formed of a protruding portion, and
wherein the magnetosensitive device comprises a magnet for forming the magnetic field between the magnetic scale and the magnet.

12. A magnetic position detection method to be used for a magnetic position detection device,
the magnetic position detection device comprising:
a magnetized scale in which magnetic pole pairs each having a width $2\lambda$ and each being formed of a first magnetic portion having a width $\lambda$ and a second magnetic portion having the width $\lambda$, which have different magnetic properties, are arranged at equal pitches of a period of the magnetic pole pair width $2\lambda$;
a magnetosensitive device arranged so as to be opposed to the magnetized scale with a predetermined air gap therebetween, the magnetosensitive device being configured to move relatively in a direction of arrangement of the magnetized scale within a magnetic field formed by the magnetized scale while maintaining the air gap, and to measure a change of the magnetic field due to the relative movement with use of magnetosensitive elements; and
a position calculation circuit configured to analyze an output value of the magnetosensitive device, to thereby calculate a relative position between the magnetosensitive device and the magnetized scale,
the magnetosensitive device comprising, as the magnetosensitive elements, a first magnetosensitive element group in which n first magnetosensitive elements, where n is a natural number of 2 or more, are arranged at equal magnetosensitive element pitches P so that $\lambda=nP$ is established, the n first magnetosensitive elements of the first magnetosensitive element group being configured to output results of measuring the change of the magnetic field due to the relative movement in parallel,
the magnetic position detection method comprising:
a Hi/Lo determination step of making, by the position calculation circuit, a Hi/Lo determination on each of the n output values output from the magnetosensitive device in parallel to obtain binary values, and outputting the obtained binary values as n Hi/Lo outputs;
a storing step of storing, by the position calculation circuit, a position calculation table in a storage unit, in which a relationship between 2n internal magnetic pole positions M, where M represents 2n integers of 0 or more and 2n−1 or less, which are the relative positions within the magnetic pole pair width $2\lambda$, and a pattern of the n Hi/Lo outputs is defined in advance; and
an internal magnetic pole position calculation step of calculating, by the position calculation circuit, based on the position calculation table stored in the storage unit in the storing step, the internal magnetic pole position M of the magnetosensitive device corresponding to the n Hi/Lo outputs as a position detection resolution of $\lambda/n$.

* * * * *